United States Patent
McKinzie et al.

(10) Patent No.: US 9,812,920 B2
(45) Date of Patent: Nov. 7, 2017

(54) AIR-COOLED ELECTRIC MACHINE AND METHOD OF ASSEMBLING THE SAME

(71) Applicant: Regal Beloit America, Inc., Beloit, WI (US)

(72) Inventors: Marc McKinzie, West Milton, OH (US); Stephen Thomas English, Englewood, OH (US); Justin Michael Magyar, Troy, OH (US); Zachary Alexander Borts, Dayton, OH (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 477 days.

(21) Appl. No.: 14/486,845

(22) Filed: Sep. 15, 2014

(65) Prior Publication Data
US 2016/0079824 A1   Mar. 17, 2016

(51) Int. Cl.
| H02K 9/00 | (2006.01) |
| H02K 5/20 | (2006.01) |
| H02K 5/22 | (2006.01) |
| H02K 9/06 | (2006.01) |
| H02K 9/22 | (2006.01) |

(52) U.S. Cl.
CPC ............. *H02K 5/20* (2013.01); *H02K 5/225* (2013.01); *H02K 9/06* (2013.01); *H02K 9/22* (2013.01)

(58) Field of Classification Search
CPC .. H02K 9/06; H02K 5/20; H02K 9/22; H02K 15/14; H02K 9/14; H02K 1/20; H02K 9/02
USPC .............. 310/58–59, 62–64, 89, 71
See application file for complete search history.

(56) References Cited

U.S. PATENT DOCUMENTS

| 6,682,320 | B2* | 1/2004 | Gold | F04D 25/082 |
| | | | | 310/62 |
| 7,802,614 | B2 | 9/2010 | Elnar | |
| 2006/0012254 | A1* | 1/2006 | Einheuser | H02K 5/18 |
| | | | | 310/58 |
| 2006/0022529 | A1* | 2/2006 | De Filippis | F04D 25/082 |
| | | | | 310/58 |
| 2006/0066155 | A1 | 3/2006 | Matin et al. | |
| 2008/0106159 | A1* | 5/2008 | Yoshida | H02K 11/33 |
| | | | | 310/50 |
| 2012/0014063 | A1 | 1/2012 | Weiss | |
| 2013/0076172 | A1 | 3/2013 | Koyama et al. | |
| 2014/0062265 | A1 | 3/2014 | Zeng et al. | |
| 2014/0175914 | A1 | 6/2014 | Zeng et al. | |
| 2014/0265664 | A1* | 9/2014 | Camilleri | H02K 15/14 |
| | | | | 310/59 |

FOREIGN PATENT DOCUMENTS

EP    1742263 A2    1/2007

OTHER PUBLICATIONS

Partial European Search Report for Application No. 15185134.2, dated May 11, 2016, 6 pages.

* cited by examiner

*Primary Examiner* — Thanh Lam
(74) *Attorney, Agent, or Firm* — Armstrong Teasdale LLP

(57) ABSTRACT

An electric machine comprises a motor housing and an electronics enclosure coupled to the motor housing. The electronics enclosure defines an air passage between the electronics enclosure and the motor housing. The electronics enclosure further defines at least one air intake connected to said air passage. The electric machine also includes a fan configured to draw air through the at least one air intake and into the air passage.

16 Claims, 9 Drawing Sheets

US 9,812,920 B2

AIR-COOLED ELECTRIC MACHINE AND METHOD OF ASSEMBLING THE SAME

BACKGROUND

The field of the invention relates generally to electric machines, and more particularly, electric machines having air cooling systems.

A number of electric machines include an electric motor. One of many applications for an electric motor is to operate a pump or a blower. The electric motor may be configured to rotate an impeller within a pump or blower, which displaces a fluid. Many gas burning appliances include an electric motor, for example, without limitation, water heaters, boilers, pool heaters, space heaters, furnaces, and radiant heaters. In some examples, the electric motor powers a blower that moves air or a fuel/air mixture through the appliance. In other examples, the electric motor powers a blower that distributes air output from the appliance.

A common motor used in such systems is an alternating current (AC) induction motor. Typically, the AC induction motor is a radial flux motor, where the flux extends radially from the axis of rotation. Another type of motor that may be used in the application described above is an electronically commutated motor (ECM). ECMs include, but are not limited to, brushless direct current (BLDC) motors, permanent magnet alternating current (PMAC) motors, and variable reluctance motors. Typically, these motors provide higher electrical efficiency than an AC induction motor. Some ECMs have an axial flux configuration in which the flux in the air gap extends in a direction parallel to the axis of rotation of the rotor.

A significant problem associated with electric machines is they generate heat, which reduces their efficiency and useful life. Machine components, such as motors and electronic controls, generate high temperatures and are subjected to substantial thermal stresses. Accordingly, efficient cooling systems for the electric machines are necessary to prevent overheating of the components and to improve the overall electrical and mechanical performance and lifetime of the electric machine.

Typically, electric machines require electronic controls for controlling components of the machines, such as user interfaces and motors. Some electric machines have electronic controls coupled to the exterior of motor housings. These externally mounted electronic controls are enclosed to protect them from the environment. However, the enclosures trap heat generated by the electronic controls, reducing the efficiency and useful life of the electronic controls. In addition, heat from the motor is transferred to the electronic controls. Moreover, locating the electronic controls on an end of the motor housing inhibits providing a cooling fan for the motor. Furthermore, current approaches for coupling electronic controls to motor housings are expensive to produce and assemble and are not aesthetically pleasing. Finally, many cooling systems have open fan inlets which expose the electric machine to the environment.

BRIEF DESCRIPTION

In one aspect, an electric machine comprises a motor housing and an electronics enclosure coupled to the motor housing. The electronics enclosure defines an air passage between the electronics enclosure and the motor housing. The electronic enclosure further defines at least one air intake connected to said air passage. The electric machine also includes a fan configured to draw air through the at least one air intake and into the air passage.

In another aspect, an electronics enclosure assembly comprises an electronics enclosure and an electronics enclosure mount. The electronics enclosure mount comprises a first surface coupled to the electronics enclosure, a second surface configured to be coupled to a motor housing, and a channel. The second surface defines an opening. An air passage is defined by the first surface and the second surface between the electronics enclosure and the motor housing. The channel defines at least one air intake configured to draw air into the air passage.

In yet another aspect, a method of assembling an electric machine comprises providing a motor housing and coupling an electronics enclosure to the motor housing. The electronics enclosure is spaced from the motor housing and defines at least one air intake. The electronics enclosure and the motor housing define an air passage at least partially between the electronics enclosure and the motor housing. The air passage extends from the at least one air intake into the motor housing. A fan is positioned in flow communication with the air passage and is configured to draw air into the at least one air intake and through the air passage.

DETAILED DESCRIPTION

Described below are electric machines having air cooling systems and methods of assembling the machines. Electric machines generate heat that can become trapped in a housing that encloses at least a portion of the machine. Additionally, radiant heat from components of electric machines, such as electric motors, transfers to other components, such as electronic controls. To extend the lifetime of machine components, such as electric motors and electronic controls, it is important to keep the operating temperature down. An electronics control enclosure mounted on an end of a motor housing enables an air cooling system to cool electric machine components and prevent radiant heat from transferring between components. The electronics control enclosure defines an air passage with air intakes that facilitates a cooling airflow generated by a fan. As used herein, the term "fan" means an apparatus with a moving blade that creates airflow. As used herein, the term "blade" means a flat surface that moves air, such as a blade, a paddle, and a fin. The electronics control enclosure is an inexpensively manufactured kit that easily couples to a motor housing for assembly and replacement. Additionally, the cooling system, defined by the electronics control enclosure and the motor housing, seals fan inlets to protect the motor from the environment.

Figure 1:
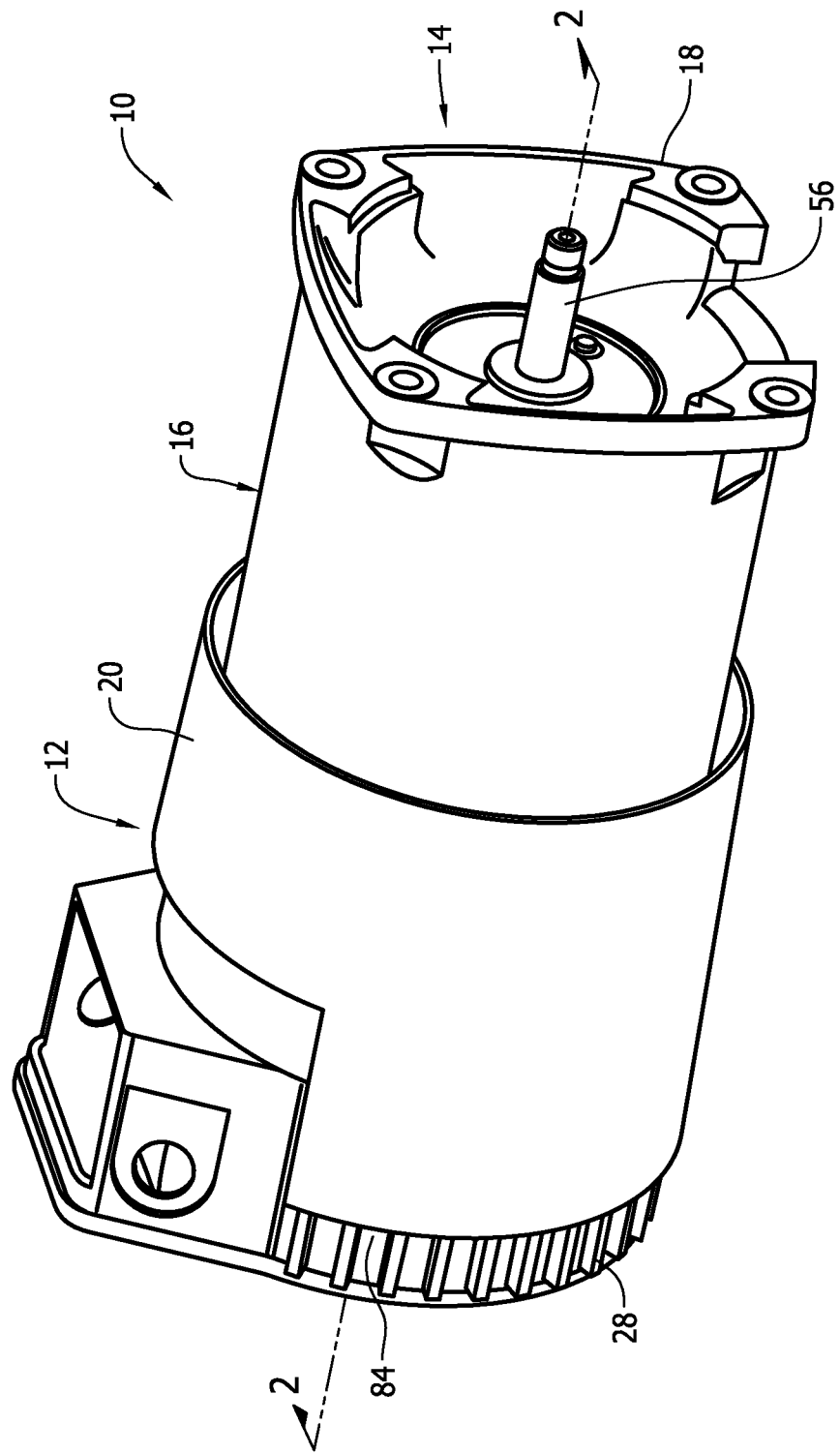
FIG. 1 is a perspective view of an exemplary electric machine.
Figure 2:
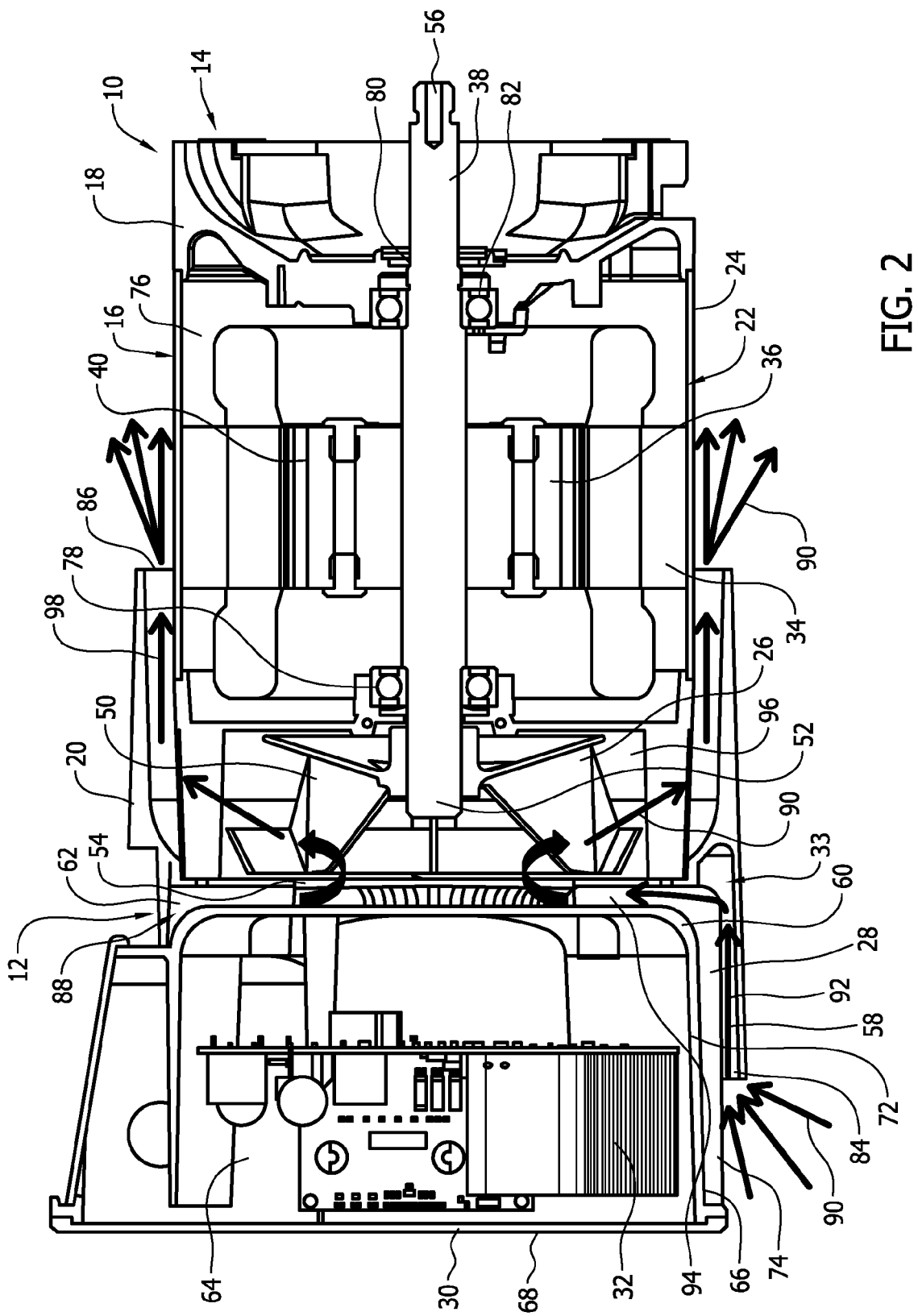
FIG. 2 is a cross-sectional view of the electric machine shown in FIG. 1 and taken along line 2-2.

FIG. 1 is a perspective view of an exemplary electric machine 10. FIG. 2 is a cross section of electric machine 10. In the exemplary embodiment, electric machine 10 is an electric motor having a first end 12 and a second end 14. Electric machine 10 generally has a housing 16, an adaptor plate 18, a shroud 20, a motor assembly 22, a motor enclosure 24, a fan assembly 26, an electronics heat sink 28, an electronics enclosure 30, and a controller board or electronics control 32. Electric machine 10 also has an air cooling system 33 that facilitates cooling motor assembly 22 and electronics control 32.

In the exemplary embodiment, housing 16 is generally defined by adaptor plate 18, shroud 20, and motor enclosure 24. Motor assembly 22 generally includes a stator 34 and a rotor 36 coupled to a shaft 38. A plurality of permanent magnets 40 are coupled to rotor 36 in any suitable configuration that enable motor assembly 22 to function as described herein. In the exemplary embodiment, stator 34 is oriented adjacent rotor 36 in an axial flux configuration. Alternatively, stator 34 may be oriented at least partially surrounding rotor 36 in a radial flux configuration. In alternative embodiments, motor assembly 22 may include a motor heat sink (not shown) to facilitate cooling motor assembly 22.

In the exemplary embodiment, fan assembly 26 generally includes a fan inlet 54 and a fan 50 coupled to a shaft first end 52. A shaft second end 56 extends from housing 16 for coupling to a component (not shown) to be driven by rotating shaft 38, for example, a pump. In the exemplary embodiment, rotor 36 is rotatable within housing 16 and, more specifically, rotor 36 is rotatable within motor enclosure 24. Rotor 36 is driven by stator 34, which is controlled by electronics control 32. In some embodiments, electronics control 32 acts as a sinusoidal or trapezoidal electronics control for stator 34.

In the exemplary embodiment, electronics enclosure 30 is coupled to shroud 20 on first end 12 of housing 16. Alternatively, electronics enclosure 30 couples to an adapter piece or mount (not shown) that defines a space between shroud 20 and electronics enclosure 30. In the exemplary embodiment, electronics enclosure 30 is positioned in a shroud cavity 58 such that an exterior surface 60 of electronics enclosure 30 is spaced from an interior surface 62 of shroud 20. Electronics enclosure 30 is coupled to shroud 20 such that electronics enclosure 30 is in-line with motor assembly 22 and fan 50. Fan 50 is positioned between electronics enclosure 30 and motor assembly 22.

Electronics enclosure 30 includes an inner cavity 64 defined by a controller cup 66 and a controller cover 68. Electronics control 32 is mounted within electronics enclosure 30 and facilitates control of motor assembly 22. Electronics enclosure 30 is substantially air-tight and inner cavity 64 is substantially thermally isolated from other portions of electric machine 10. In particular, inner cavity 64 is substantially thermally isolated from motor enclosure 24 to prevent transfer of thermal energy to electronics control 32, which directly affects the useful lifetime of electric machine 10.

Electronics control 32 is thermally coupled to electronics heat sink 28, which facilitates removal of thermal energy generated by electronics control 32 from electronics enclosure 30. In the exemplary embodiment, electronics heat sink 28 includes a body portion 72 having a plurality of generally ribbed heat fins 74 extending therefrom. However, in alternate embodiments, heat fins 74 have any suitable shape that enables electronics heat sink 28 to function as described herein. Body portion 72 is thermally coupled to electronics control 32 and transfers thermal energy generated by electronics control 32 out of inner cavity 64 via heat fins 74, as described below in more detail.

In the exemplary embodiment, motor enclosure 24 includes an inner cavity 76 defined by motor enclosure 24. Motor assembly 22 is mounted within motor enclosure 24 and shaft first end 52 extends through an aperture 78 defined in motor enclosure 24. Shaft second end 56 extends through an aperture 80 defined in adaptor plate 18. In the exemplary embodiment, adaptor plate 18 facilitates attachment of electric machine 10 to a system (not shown) to be driven by shaft 38. Aperture 80 is sealed by shaft 38 and bearings 82 such that air does not pass therethrough. Motor enclosure 24 is substantially air-tight and is substantially thermally isolated from other portions of electric machine 10. In particular, motor enclosure 24 is substantially thermally isolated from electronics enclosure 30 to prevent transfer of thermal energy to electronics control 32.

As shown in FIG. 2, electric machine 10 includes air cooling system 33 defined by housing 16 and electronics enclosure 30. Air cooling system 33 generally includes an air intake 84 and an air outlet 86 fluidly connected by an air passage 88 defined by housing 16, shroud 20, and electronics enclosure 30. In the exemplary embodiment, air passage 88 facilitates a flow of cooling airflow 90 therethrough to dissipate heat from electronics heat sink 28 and motor assembly 22. Air passage 88 includes a passage first portion 92, a passage second portion 94, a passage third portion 96, and a passage fourth portion 98.

In the exemplary embodiment, heat fins 74 are oriented at least partially within passage second portion 94. Passage third portion 96 and passage fourth portion 98 are at least partially in flow communication with motor enclosure 24. Fan 50 is coupled to shaft first end 52 and is rotatably mounted at least partially within passage third portion 96. Rotation of fan 50 facilitates pulling air into air intake 84 such that the cooling airflow 90 passes through passage first portion 92 and into passage second portion 94. Cooling airflow 90 contacts electronics heat sink 28 and removes heat generated by electronics control 32 through electronics heat sink body portion 72 and heat fins 74. Cooling airflow 90 then passes through passage third portion 96 and passage fourth portion 98 where the cooling airflow removes heat generated by motor assembly 22. Heated airflow 90 is then exhausted from housing 16 through air outlet 86. In the exemplary embodiment, air outlet 86 is located a suitable distance from air intake 84 to facilitate preventing hot exhaust from being drawn back into air intake 84. Moreover, in the exemplary embodiment, electronics heat sink 28 is positioned at least partially within air passage 88 upstream of motor assembly 22. Positioning electronics enclosure 30 external to housing 16 minimizes the radiant transfer of thermal energy between motor enclosure 24 and electronics enclosure 30 and covers fan inlet 54 to protect electric machine 10 from the environment.

An exemplary method of assembling electric machine 10 is described herein. The method includes providing housing 16 having air intake 84, air outlet 86, and air passage 88 extending between air intake 84 and air outlet 86. Motor enclosure 24 and electronics enclosure 30 are substantially thermally isolated from each other. Motor assembly 22 is coupled within motor enclosure 24 and electronics control 32 is coupled within electronics enclosure 30. Motor assembly 22 is positioned at least partially within air passage 88. Electronics heat sink 28 is thermally coupled to electronics control 32 and is positioned at least partially within air passage 88 upstream of motor assembly 22. Fan 50 is rotatably mounted within air passage 88 to shaft 38 downstream of electronics heat sink 28, upstream of motor assembly 22, and generally between motor enclosure 24 and electronics enclosure 30.

Figure 3:
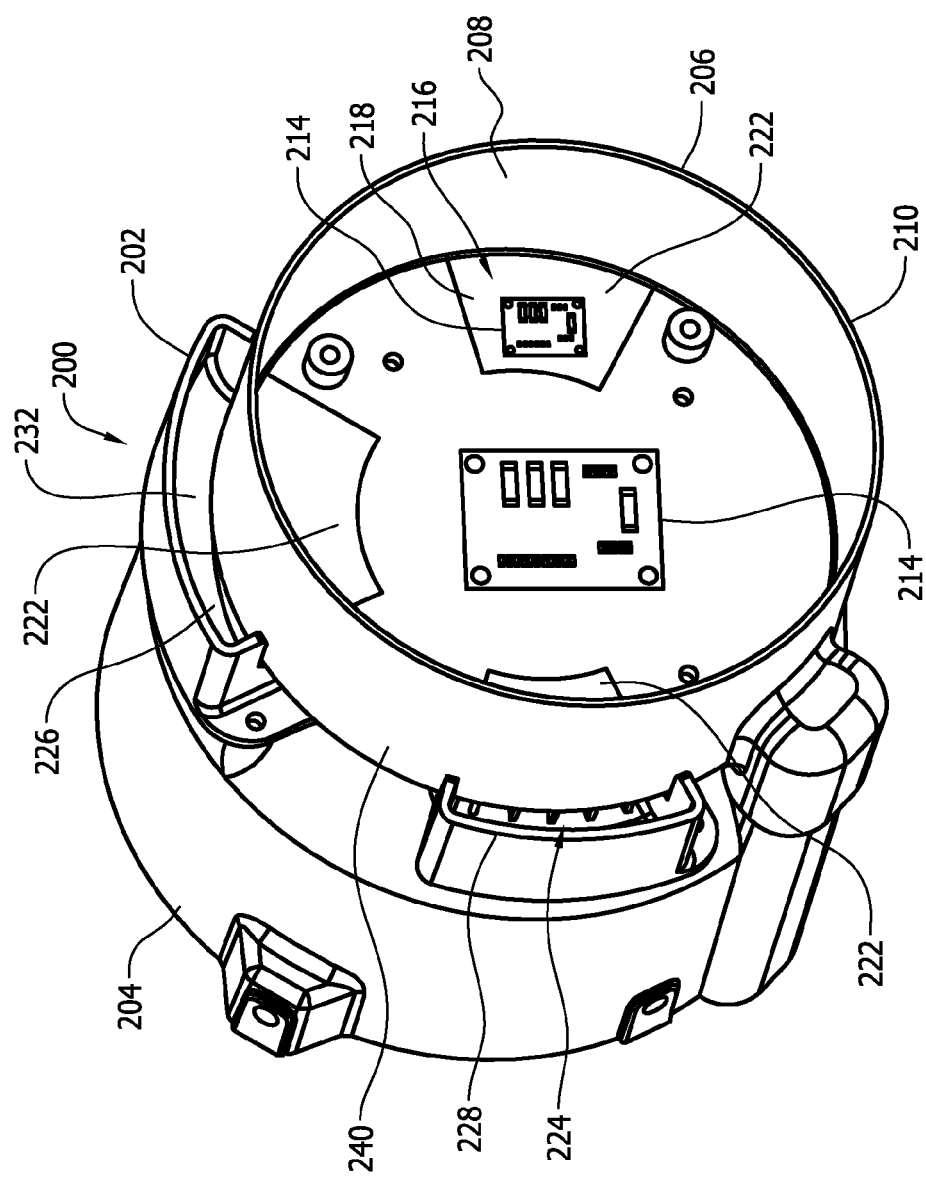
FIG. 3 is a perspective view of an exemplary electronics enclosure assembly.
Figure 4:
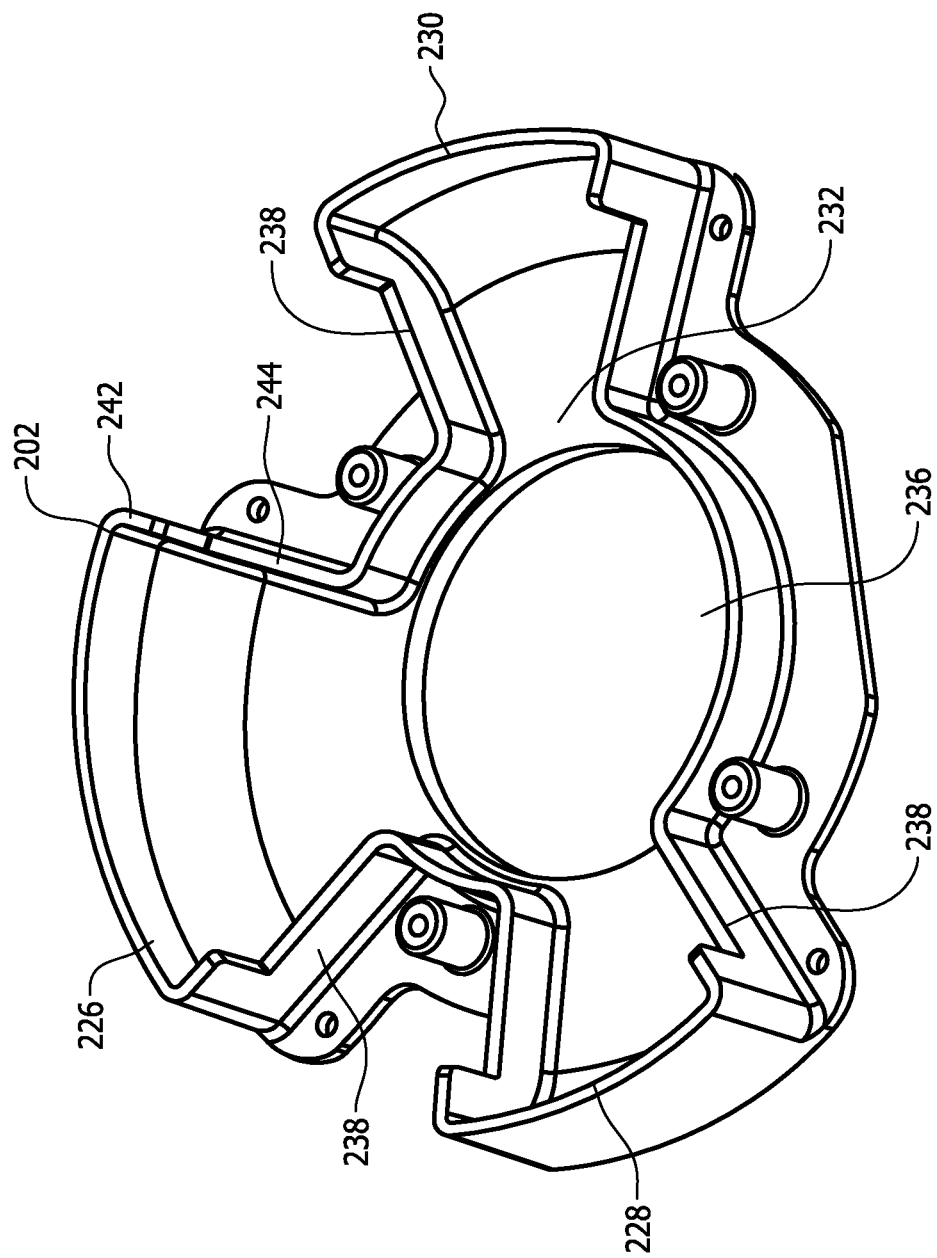
FIG. 4 is a top perspective view of a portion of the electronics enclosure assembly shown in FIG. 3.
Figure 5:
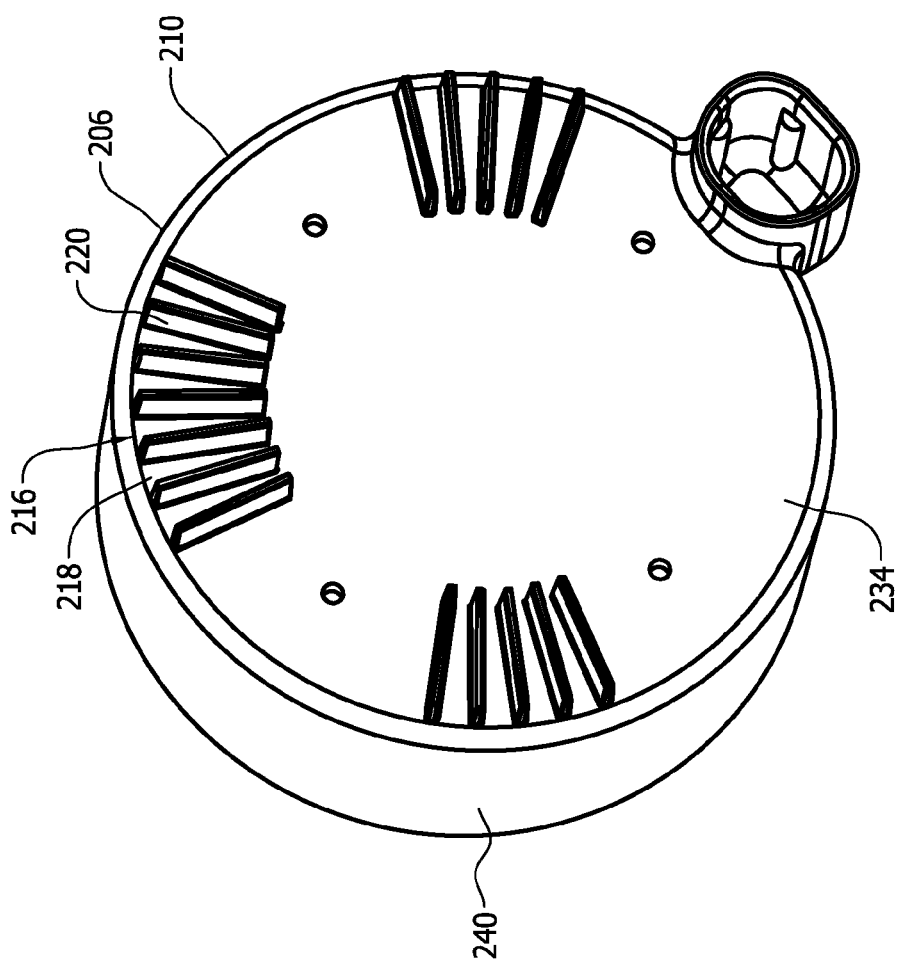
FIG. 5 is a bottom perspective view of another portion of the electronics enclosure assembly shown in FIG. 3.

FIG. 3 is a partial perspective view of an electronic enclosure assembly 200 that is similar to electric machine 10 shown in FIGS. 1 and 2, except electronics enclosure assembly 200 includes a mount 202. FIG. 4 is a top perspective view of a portion of electronics enclosure assembly 200. FIG. 5 is a bottom perspective view of a portion of electronics enclosure assembly 200. In the exemplary embodiment, mount 202 couples to a shroud 204 for covering a motor assembly (not shown). An electronics enclosure 206 couples to mount 202 and has an inner cavity 208 defined by a controller cup 210 and a controller cover (not shown). In the exemplary embodiment, mount 202 and electronics enclosure 206 are formed as separate pieces. In alternate embodiments, electronics enclosure 206 and mount 202 are integrally formed as a unitary piece. An electronics control 214 is mounted within inner cavity 208 of electronics enclosure 206. To protect electronics control 214, electronics enclosure 206 is substantially air-tight and inner cavity 208 is substantially thermally isolated from shroud 204.

Electronics control 214 is thermally coupled to electronics heat sink 216, which facilitates removal of thermal energy generated by electronics control 214 from electronics enclosure 206. In the exemplary embodiment, electronics heat sink 216 includes a body portion 218 having a plurality of heat fins 220 extending therefrom. Body portion 218 is thermally coupled to electronics control 214 and transfers thermal energy generated by electronics control 214 out of inner cavity 208 via heat fins 220, as described herein in more detail. Body portion 218 includes pads 222 in inner cavity 208 to facilitate the transfer of thermal energy from critical components of electronics control 214 to heat fins 220.

As shown in FIG. 3, electronic enclosure assembly 200 defines an air cooling system 224. In the exemplary embodiment, air cooling system 224 generally includes a first air intake 226, a second air intake 228, and a third air intake 230 fluidly connected to an air passage 232 defined by electronics enclosure 206, mount 202, and shroud 204. In alternate embodiments, air cooling system 224 includes any number of air intakes and air passages. In the exemplary embodiment, air passage 232 facilitates a flow of cooling airflow therethrough to dissipate heat from electronics heat sink 216. Air passage 232 is defined by mount 202, a bottom surface 234 of electronics enclosure 206 and an opening 236 in mount 202. Opening 236 is aligned with an opening in shroud 204 to allow airflow into a motor housing (not shown) coupled to shroud 204.

First air intake 226, second air intake 228, and third air intake 230 are defined by channels 238 formed in mount 202, bottom surface 234, and a side surface 240 of electronic enclosure 206. Channels 238 have any shape or configuration suitable to function as described. In the exemplary embodiment, channels 238 have an upper portion 242 and a lower portion 244, which join at an elbow to form a substantially L-shaped cross section. Thus, channels 238 extend along bottom surface 234 and side surface 240 to draw air spaced from shroud 204 into first air intake 226, second air intake 228, and third air intake. Beneficially, this allows cooling system 224 to draw air into air passage 232 that has not been heated by a motor (not shown). Additionally, channels 238 are wider near first air intake 226, second air intake 228, and third air intake 230 and narrower near opening 236. The narrowing width causes airflow to increase in velocity and decrease in pressure as it passes heat fins 220 and flows into opening 236. As a result, the system operates at a greater cooling efficiency while generating less noise.

In the exemplary embodiment, heat fins 220 are oriented at least partially within air passage 232. A fan (not shown) rotates to draw air into first air intake 226, second air intake 228, and third air intake 230 such that cooling airflow is directed through air passage 232. The cooling airflow contacts electronics heat sink 216 and removes heat generated by electronics control 214 through electronics heat sink body portion 218 and heat fins 220.

An exemplary method of assembling electronic enclosure assembly 200 is described herein. The method includes providing shroud 204 and coupling mount 202 to shroud 204. Electronics enclosure 206 for enclosing electronics component 214 is coupled to mount 202. Thereby, electronics enclosure 206 and mount 202 substantially thermally isolate electronics component 214 from shroud 204. Electronics control 214 is thermally coupled to electronics heat sink 216, which is positioned at least partially within air passage 232. In the exemplary embodiment, electronics enclosure 206, mount 202, and shroud 204 define first air intake 226, second air intake 228, third air intake 230 and air passage 232.

Figure 6:
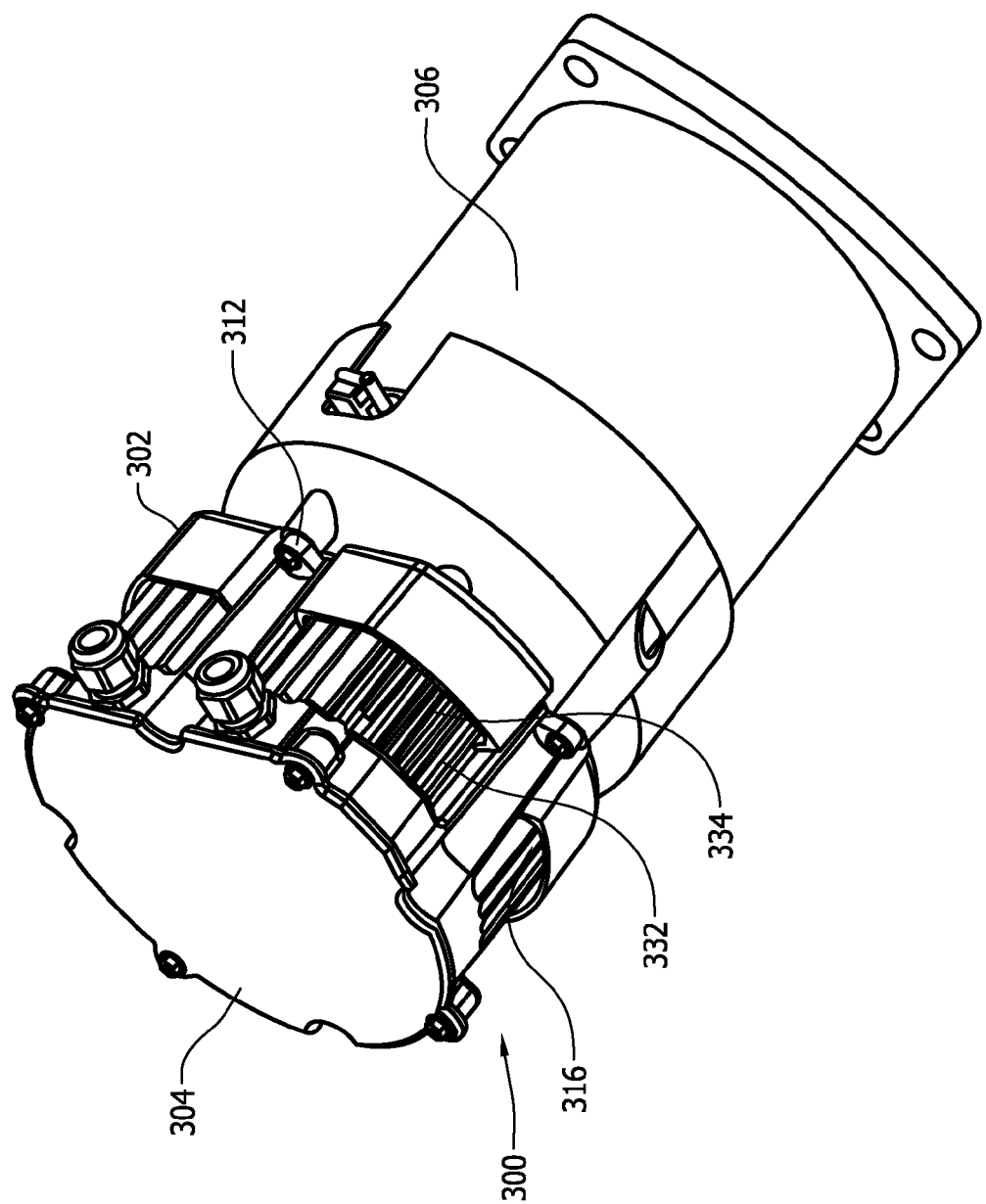
FIG. 6 is a perspective view of another exemplary electric machine.
Figure 7:
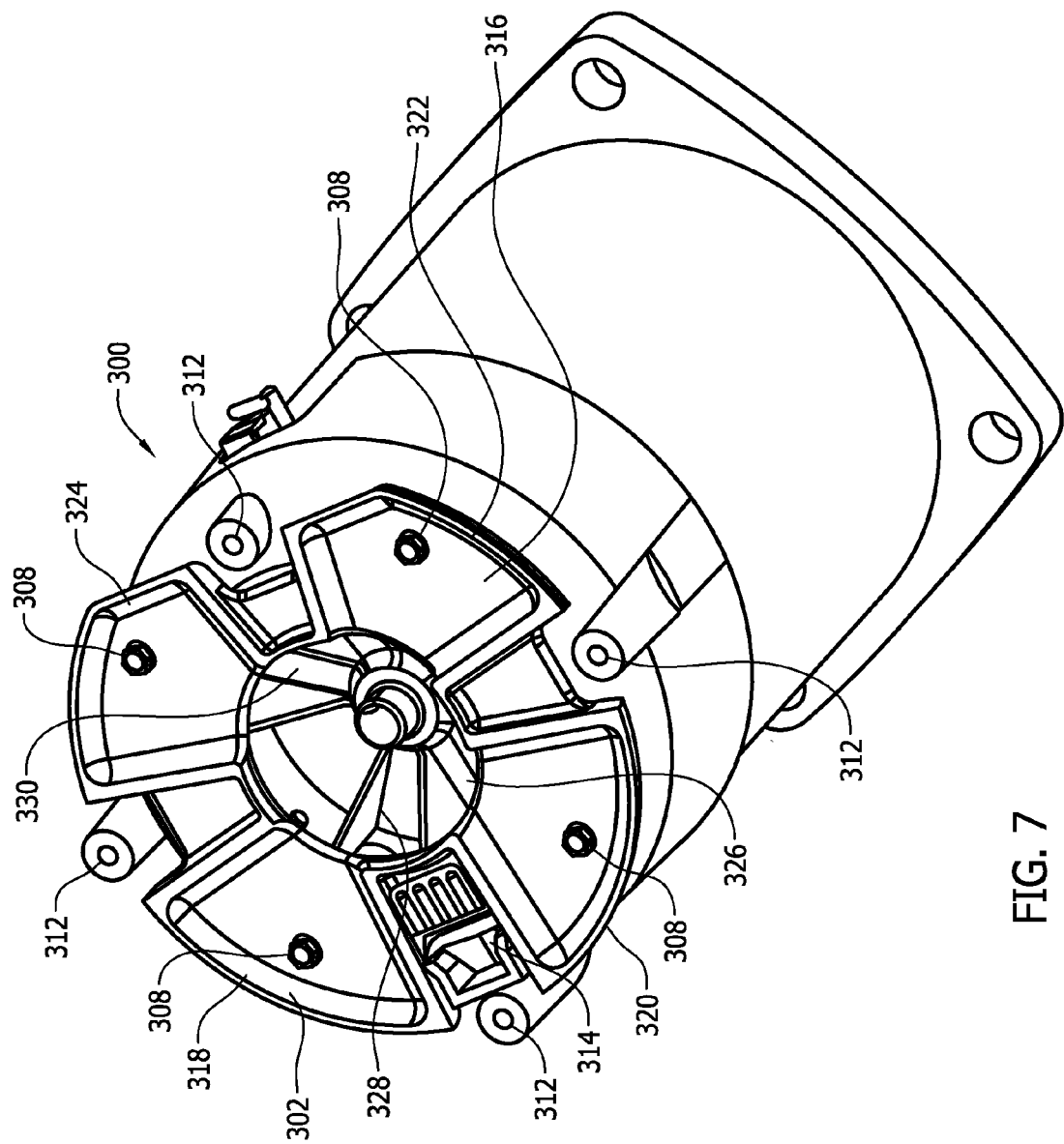
FIG. 7 is a perspective view of the electric machine shown in FIG. 6 with a portion removed.

FIG. 6 is a perspective view of an electric machine 300 that is similar to electric machine 10 shown in FIGS. 1 and 2, except electric machine 300 includes a mount 302. FIG. 7 is a perspective view of electric machine 300 with an electronics enclosure 304 removed to reveal mount 302. In the exemplary embodiment, mount 302 is coupled to a housing 306 by fasteners 308 through the interior of mount 302. Additionally, electronics enclosure 304 is coupled to housing 306 by fasteners 312. In other embodiments, electronics enclosure 304 couples to mount 302 instead of housing 306 and, in further embodiments, fasteners (not shown) extend through electronics enclosure 304 and mount 302 to simultaneously couple both to housing 306. In alternative embodiments, mount 302, electronics enclosure 304, and housing 306 are coupled using mechanical fasteners, weld, adhesive, and/or any other suitable coupling means that enable electric machine 300 to function as described.

In the exemplary embodiment, a conduit 314 extends along mount 302 to enclose wires (not shown) running from electronics enclosure 304 into housing 306. Importantly, conduit 314 facilitates positioning electronics enclosure 304 on the exterior of housing 306 and protects wires from the environment.

Mount 302, electronics enclosure 304, and housing 306 define an air passage 316 connected to a first air intake 318, a second air intake 320, a third air intake 322, and a fourth air intake 324. A mount opening 326 and a fan air intake 328 are substantially aligned to facilitate airflow through air passage 316 into housing 306. A fan 330 is rotatably mounted in housing 306 to draw airflow into first air intake 318, second air intake 320, third air intake 322, and fourth air intake 324 and through air passage 316. Within electronics enclosure 304, an electronics control (not shown) is thermally coupled to electronics heat sink 332 including heat fins 334. Heat fins 334 extend around the outside of electronics enclosure 304 and are oriented at least partially within air passage 316. The airflow removes heat from heat fins 334, thus cooling electronics control within electronics enclosure 304. In alternative embodiments, heat fins 334 are oriented in any fashion that allows airflow to cool electronics enclosure 304 as described. Alternatively, heat fins 334 can be omitted.

An exemplary method of assembling electric machine 300 includes providing housing 306 and coupling mount 302 to housing 306. Electronics enclosure 304 is coupled to mount 302 and substantially thermally isolated from housing 306. Electronics enclosure 304, mount 302, and housing 306 are positioned to define first air intake 318, second air intake 320, third air intake 322, fourth air intake 324 and air passage 316. Electronics heat sink 332 is positioned at least partially within air passage 316. Fan 330 is rotatably mounted within housing 306 downstream of electronics heat sink 332 and in flow communication with air passage 316 to draw airflow into first air intake 318, second air intake 320, third air intake 322, and fourth air intake 324 and through air passage 316 to housing 306.

Figure 8:
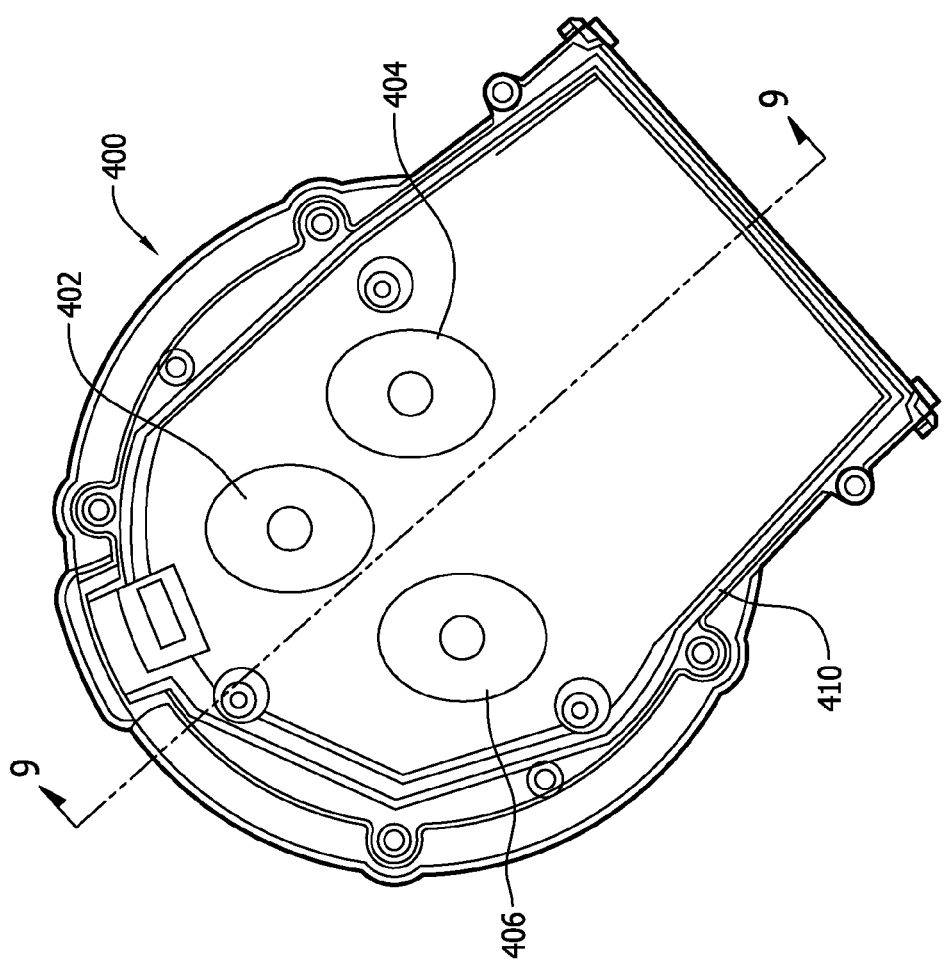
FIG. 8 is a top view of yet another electric machine.
Figure 9:
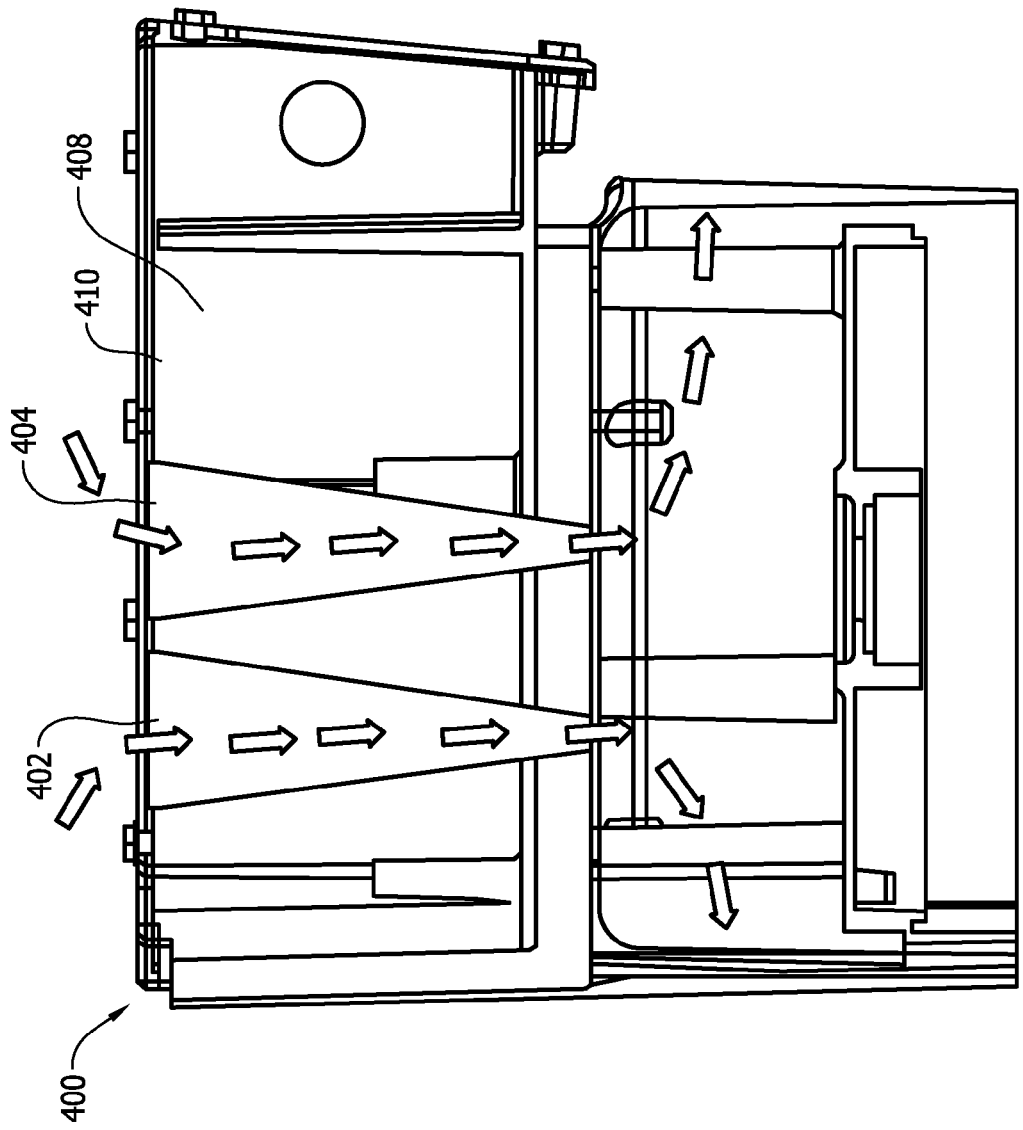
FIG. 9 is a cross-sectional view of the electric machine shown in FIG. 8 and taken along line 9-9.

FIG. 8 is a top view of an electric machine 400 that is similar to electric machine 10 shown in FIGS. 1 and 2, except electric machine 400 includes a first air intake 402, a second air intake 404, and a third air intake 406 extending through an inner cavity 408 of an electronics enclosure 410. FIG. 9 is a cross-sectional view of electric machine 400 taken along line 9-9. In the exemplary embodiment, first air intake 402, second air intake 404, and third air intake 406 are shaped as inverted cones, meaning the cross-sectional area gets smaller along the direction of airflow through the first air intake 402, second air intake 404, and third air intake 406. The airflow through first air intake 402, second air intake 404, and third air intake 406 decreases in pressure and increases in speed with the decreasing cross-sectional area. Advantageously, this has a supercooling effect on the interior of electronics enclosure 410. Additionally, low pressure airflow allows the system to operate more efficiently while generating minimal noise. In alternative embodiments, electronic enclosure 410 defines any number of air intakes of varying or constant shape. For example, in one embodiment, a single intake (not shown) with a constant cross-sectional area passes through the center of electronics enclosure 410.

Described herein are systems and methods for air cooling an electric machine such as a motor or a generator. The electric machine has a housing having at least one air intake, an air outlet, and an air passage between the at least one air intake and air outlet. Substantially air-tight enclosures for a motor assembly and electronics components are formed and coupled together. Heat sinks thermally couple the enclosures and the air passage such that a cooling airflow through the air passage facilitates cooling of the components within the enclosures. In one aspect, the electronics enclosure heat sink is located within the air passage upstream of the motor enclosure. Moreover, the enclosures are substantially thermally isolated from each other at least by the air passage to prevent transfer of thermal energy between the enclosures. Accordingly, the electronics components are cooled and protected from other heat generating components of the electric machine to prevent thermal degradation and to facilitate longer life of the electronics components. The electric machine described herein enables cooling air to be better concentrated over hot areas of the system.

Further, a fan is rotatably mounted within the air passage internally within the electric machine to facilitate the cooling airflow through the air passage and to prevent external access to the moving fan. Because the fan is located internally within the electric machine (i.e., not accessible from outside the housing), the electric machine produces less audible noise pollution and prevents injuries associated with contacting the fan. In an alternative embodiment, the fan is located outside of the air passage but in flow communication with the air passage.

Some embodiments described herein relate to electric machines including electric motors and electronic controls. However, the methods and apparatus are not limited to the specific embodiments described herein, but rather, components of apparatus and/or steps of the methods may be utilized independently and separately from other components and/or steps described herein. For example, the methods may also be used in combination with any machine, and are not limited to practice with the electric machines as described herein. In addition, the exemplary embodiment can be implemented and utilized in connection with many other mechanical applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

What is claimed is:

1. An electric machine comprising:
  a motor housing;
  an electronics enclosure coupled to said motor housing defining an air passage between said electronics enclosure and said motor housing, said electronics enclosure further defining at least a portion of at least one air intake connected to said air passage, wherein said electronics enclosure is substantially air-tight; and
  a fan configured to draw air through said at least one air intake and into said air passage.

2. The electric machine of claim 1 wherein said at least one air intake is configured to prevent drawing air that has been heated by said motor housing into said at least one air intake.

3. The electric machine of claim 1 wherein said motor housing further comprises a shroud at least partially defining said air passage, wherein said electronic enclosure is positioned in a cavity of said shroud such that said air passage is defined between an exterior surface of said electronics enclosure and an interior surface of said shroud.

4. The electric machine of claim 1 wherein said at least one air intake extends through an interior of said electronics enclosure and has a cross-sectional area that varies along a longitudinal length of said at least one air intake.

5. The electric machine of claim 1 further comprising a motor assembly positioned in said motor housing and an electronics control positioned in said electronic enclosure.

6. The electric machine of claim 5 further comprising at least one heat sink thermally coupled to at least one of said electronics control and said motor assembly, said at least one heat sink extending at least partially into said air passage.

7. An electronics enclosure assembly comprising:
an electronics enclosure defining an inner cavity configured to receive an electronics control, wherein said electronics enclosure is substantially air-tight; and
an electronics enclosure mount comprising a first surface coupled to said electronics enclosure, a second surface configured to be coupled to a motor housing, and a channel, said second surface defining an opening, said first surface and said second surface defining an air passage between said electronics enclosure and said motor housing, and said channel defining at least one air intake configured to draw air into said air passage.

8. The electronics enclosure assembly of claim 7 wherein said electronics enclosure further comprises at least one heat sink positioned in said air passage.

9. The electronics enclosure assembly of claim 7 further comprising a wire conduit on an exterior of said electronics enclosure mount and separate from said at least one air intake.

10. The electronics enclosure assembly of claim 7 wherein said electronic enclosure comprises:
a controller cup comprising a bottom and an open top, said bottom coupled to said first surface; and
a controller cover configured to close said open top.

11. The electronics enclosure assembly of claim 10 wherein said electronics enclosure and said electronics enclosure mount are integrally formed.

12. An electric machine comprising:
a motor having a shaft extending along an axis, said motor enclosed in a motor housing;
a fan coupled to said shaft; and
an electronics enclosure coupled to said motor housing in-line with said motor and said fan, said fan positioned between said motor and said electronics enclosure, wherein said electronics enclosure is substantially air-tight.

13. The electric machine of claim 12 wherein said electronics enclosure comprises:
a controller cup comprising a bottom and an open top, said bottom coupled to said motor housing; and
a controller cover configured to close said open top.

14. The electric machine of claim 12 wherein said electronics enclosure defines at least a portion of at least one air intake.

15. The electric machine of claim 12 wherein said motor housing comprises a shroud, said electronics enclosure coupled to said shroud, wherein said electronic enclosure is positioned in a cavity of said shroud.

16. The electric machine of claim 15 wherein said shroud and said electronics enclosure define an air passage, said fan configured to draw air through said air passage.

* * * * *